United States Patent [19]

Kyts

[11] 4,240,865
[45] Dec. 23, 1980

[54] APPARATUS AND METHOD FOR APPLYING PLASTIC STRAP

[75] Inventor: Robert B. Kyts, Chicago, Ill.

[73] Assignee: Interlake, Inc., Oak Brook, Ill.

[21] Appl. No.: 51,732

[22] Filed: Jun. 25, 1979

Related U.S. Application Data

[63] Continuation of Ser. No. 701,306, Jun. 30, 1976, abandoned.

[51] Int. Cl.³ .............................................. B65B 13/02
[52] U.S. Cl. ...................................... 156/494; 53/562; 100/33 PB; 156/499; 156/502; 156/581
[58] Field of Search ............... 156/157, 159, 304, 322, 156/494, 499, 210, 502, 507, 544, 553, 581, 205, 206, 583.1; 100/33 PB; 53/562

[56] References Cited

U.S. PATENT DOCUMENTS

| 2,610,137 | 9/1952 | Williams et al. | 156/581 |
|---|---|---|---|
| 2,685,911 | 8/1954 | Haller | 156/210 |
| 2,734,984 | 2/1956 | Brunner | 156/502 |
| 3,725,164 | 4/1973 | Albinger et al. | 156/102 |
| 3,944,460 | 3/1976 | Karr | 156/494 |

*Primary Examiner*—Caleb Weston

*Attorney, Agent, or Firm*—Vogel, Dithmar, Stotland, Stratman & Levy

[57] ABSTRACT

A manually operable combination strapping tool for applying plastic strapping around an object includes a strap-tensioning and gripping mechanism for holding the strap in a tensioned loop around the object with the supply portion of the strap overlapping the leading end thereof, and a heat-sealing mechanism which includes a movable pressure block and a heater movable to and from a heating position between the overlapping strap portions. As the heater is moved between the overlapping strap portions, the pressure block is moved to cooperate with an anvil to press together the heating element and strap portions for melting thereof. After retraction of the pressure block and the heater by separate bias means, the pressure block is moved for cooperation with the anvil to clamp therebetween and bond together the melted strap portions and sever the supply portion of the strap. Ridges on the pressure block cooperate with complementary grooves in the anvil to deform the overlapping strap portions during bonding thereof and form a corrugated joint therebetween. Means limiting the pressure with which the strap and the heater are pressed together and cooling means are also provided.

8 Claims, 13 Drawing Figures

APPARATUS AND METHOD FOR APPLYING PLASTIC STRAP

This is a continuation of application Ser. No. 701,306 filed June 30, 1976, now abandoned.

BACKGROUND OF THE INVENTION

The present invention relates to apparatus for applying strapping around an object. More particularly, the invention relates to apparatus for tensioning plastic strapping in a loop around an object and forming a heat-sealed joint in the strap loop for securing it about the object.

The present invention is an improvement of the strapping apparatus disclosed in U.S. Pat. No. 3,944,460, issued to G. A. Karr on Mar. 16, 1976, entitled "COMBINATION STRAPPING TOOL FOR PLASTIC STRAP", and assigned to the assignee of the present invention. That strapping tool has a heat-sealing mechanism including a cam shaft adapted for camming engagement with a movable pressure block and with a rocker arm which is in turn releasably coupled to a movable heater. As the cam shaft is rotated, the rocker arm moves the heater between the overlapping strap portions and the pressure block is moved to press together the heating element and the strap portions for melting thereof. Further rotation of the cam shaft disengages it from the pressure block and decouples the rocker arm from the heater to permit retraction of the pressure block and the heater by separate bias means. Further rotation of the cam shaft again effects cammed movement of the pressure block to bond together the melted strap portions and to sever the supply portion of the strap.

In that prior strapping tool, the pressure block cooperates with a strap guide surface on an anvil-like base member for pressing therebetween the overlapping strap portions, both the strap guide surface and the pressure block having substantially smooth planar pressure surfaces thereon. Because of manufacturing imperfections in producing such surfaces economically, it is not possible with the prior art strapping tool to achieve a truly even distribution of pressure throughout the seal area. Furthermore, it has been found that the bond between the overlapping melted strap portions formed by the prior strapping tool is not sufficiently strong for certain high load applications.

SUMMARY OF THE INVENTION

In the present invention the prior art strapping tool has been provided with improved pressure means for providing an improved and strengthened joint in the overlapping strap portions.

It is a significant feature of the present invention that the pressure means for pressing together the melted overlapping portions of the strap includes deforming surfaces for deforming the overlapping strap portions in a predetermined pattern as they are pressed together, thereby more evenly to distribute the pressure throughout the bond area and to provide a strengthened joint.

More specifically, it is an important feature of this invention that the pressure means includes two opposed members which respectively have complementary deforming means thereon which cooperate in use to deform or emboss the overlapping strap portions in the predetermined pattern.

Another feature of this invention is that the pressure means is so formed as to provide a plurality of longitudinally extending and laterally alternating ridges and valleys in the overlapping strap portions to provide a generally corrugated joint therebetween, the formation of the ridges and valleys producing a kneading-like motion of molten strapping surfaces as the overlapping strapped portions are pressed together, and an increase in the area of contact between the molten faces of the overlapping strap portions, resulting in a much stronger bond therebetween.

These features are achieved, and it is an object of this invention to obtain these advantages by providing strapping apparatus for securing a length of plastic strap around an object, the apparatus comprising a frame, strap-gripping means mounted on the frame for holding the strap encircled in a loop in a tensioned condition about the object with the leading end of the strap overlapping and spaced from the supply portion thereof, heating means mounted on said frame adjacent to the overlapping strap portions for effecting melting of the facing portions thereof, pressure means carried by the frame for pressing together the melted overlapping portions of the strap to effect a joint therebetween, the pressure means including deforming means for deforming the melted overlapping portions of the strap in a predetermined pattern as they are pressed together, whereby the pressure of the pressure means is evenly distributed throughout the interface between the melted overlapping portions and a stronger bond is produced therebetween.

In connection with the foregoing object, it is another object of this invention to provide strapping apparatus of the type set forth, wherein one of the pressure members includes a plurality of longitudinally extending and laterally spaced apart ribs or ridges which respectively cooperate with a plurality of channels or grooves in the other pressure member for pressing therebetween and deforming the overlapping strap portions to provide a generally corrugated joint therebetween.

Further features of the invention pertain to the particular arrangement of the parts of the strapping apparatus and the steps of the strapping method whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

Figure 1:
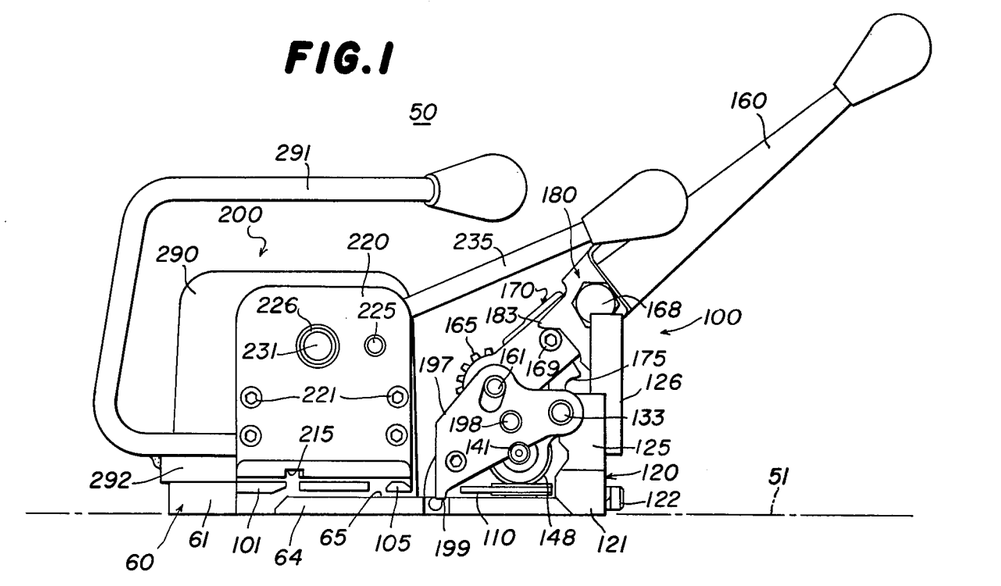
FIG. 1 is a side elevational view of the strapping apparatus of the present invention shown in its operative position for applying plastic strapping around an object.
Figure 2:
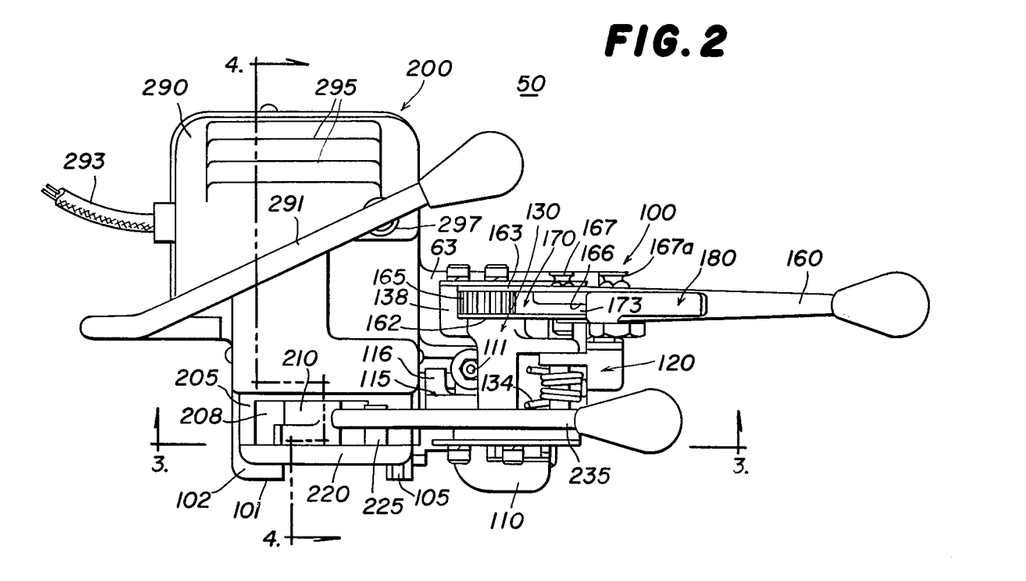
FIG. 2 is a top plan view of the strapping apparatus shown in FIG. 1.

Referring now in particular to FIGS. 1 and 2 of the drawings, there is illustrated a strapping apparatus consisting of a combination tensioning and heat-sealing tool constructed in accordance with and embodying the features of the present invention, and generally designated by the numeral 50. The combination tool 50 is an improvement of the tool disclosed in the aforementioned U.S. Pat. No. 3,944,460. Indeed, most of the combination tool 50 is identical in construction to the tool of said prior patent and such identical parts may be described herein only briefly, the detailed description being found in said patent, the disclosure of which is incorporated herein by reference.

In FIG. 1, the combination tool 50 is illustrated in its operative position for applying a length of plastic strap, such as polypropylene strap, for example, in a tensioned loop about a package or other object 41, the strap being disposed in the combination tool 50 so that the supply portion 57 of the strap is disposed in overlapping relationship with the leading end 56 thereof. The combination tool 50 includes a common baseplate, generally designated by the numeral 60, on which is mounted gripping and tensioning apparatus, generally designated by the numeral 100, and heat-sealing and shearing apparatus, generally designated by the numeral 200.

Figure 3:
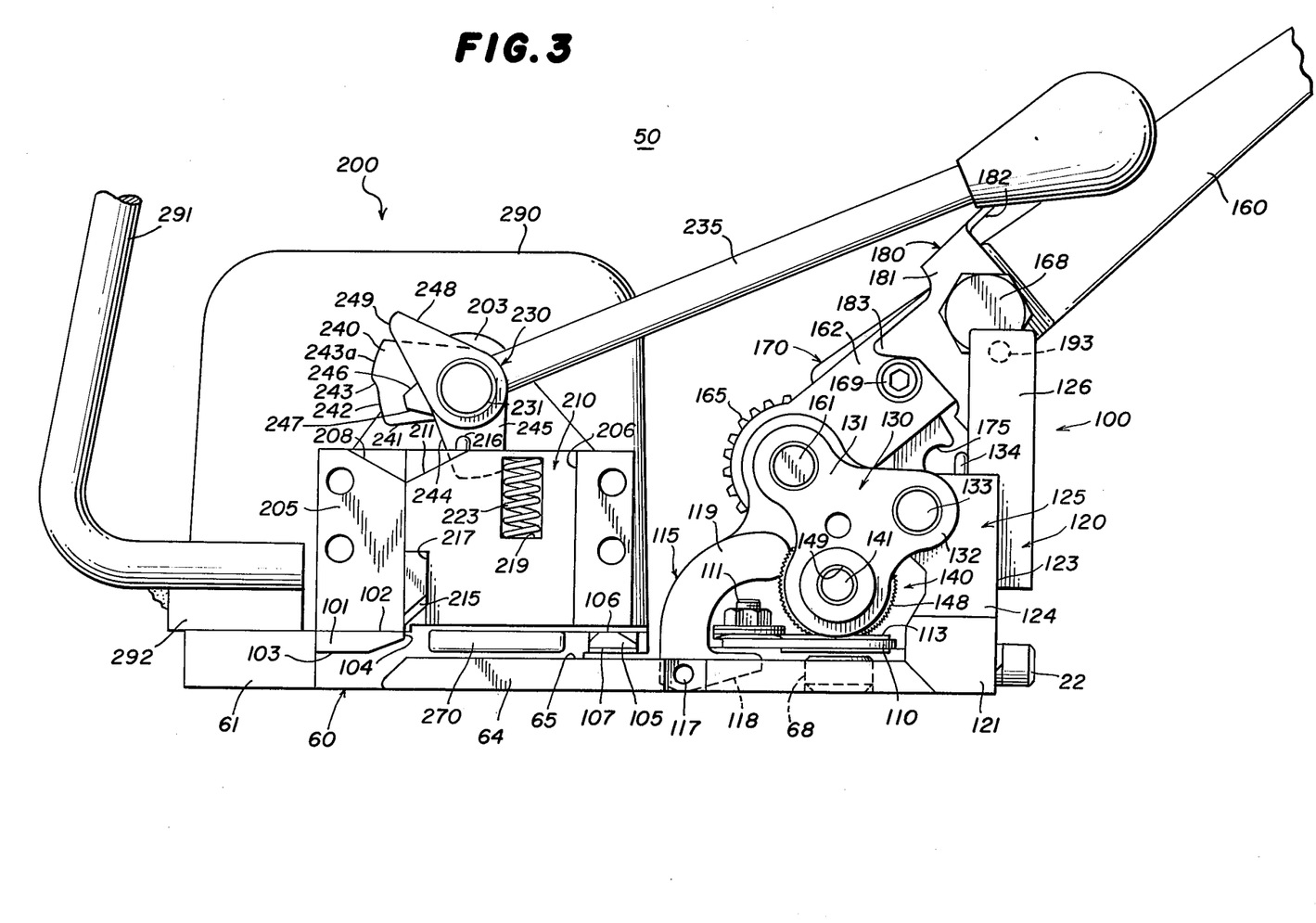
FIG. 3 is an enlarged fragmentary side elevational view of the strapping apparatus of the present invention taken along the line 3—3 in FIG. 2 more clearly to show the internal construction thereof, with the tensioning handle shown in an unlatched position and with the sealing handle shown in its home position.
Figure 4:
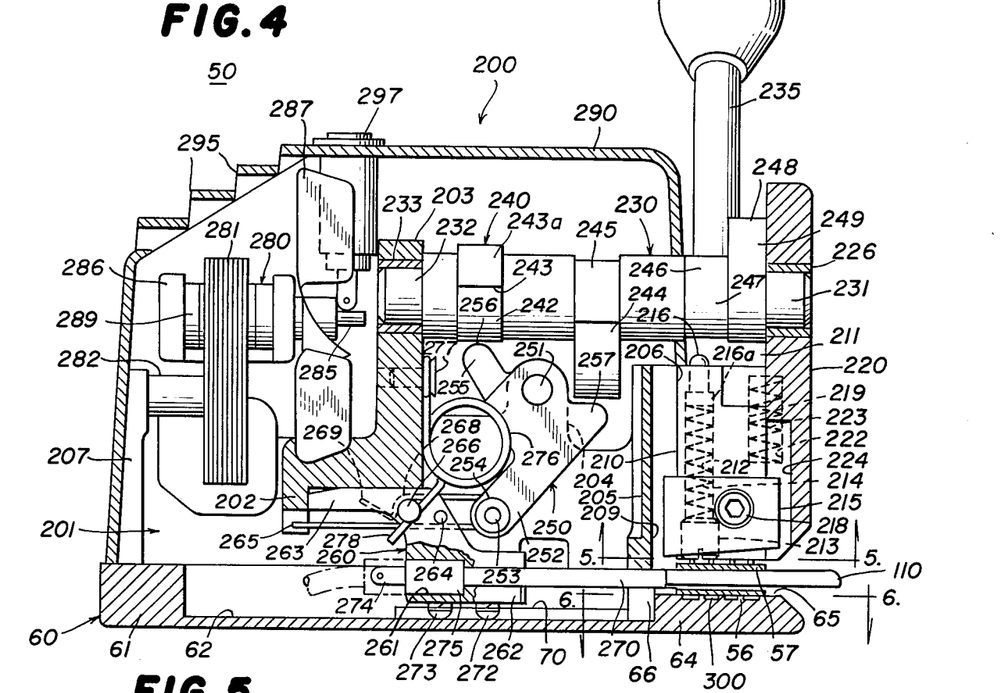
FIG. 4 is an enlarged view in vertical section of the heat-sealing portion of the strapping apparatus taken along the line 4—4 in FIG. 2.
Figure 5:
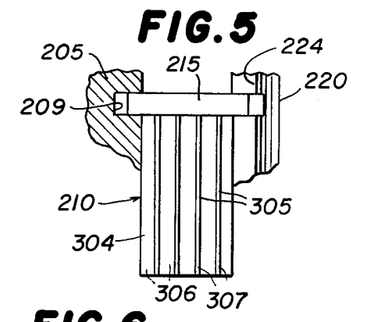
FIG. 5 is a fragmentary bottom plan view of the pressure block of the present invention, taken along the line 5—5 in FIG. 4.
Figure 6:
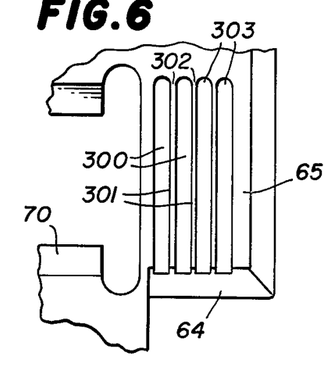
FIG. 6 is a fragmentary top plan view of the fixed anvil block of the present invention, taken along the line 6—6 in FIG. 4.
Figure 7:
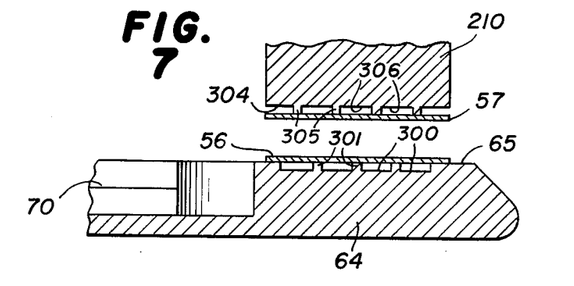
FIG. 7 is an enlarged fragmentary view in vertical section, illustrating the overlapping strap portions between the pressure members immediately after the strap heater has been removed from therebetween.

Referring now also to FIGS. 3 through 9 of the drawings, the baseplate 60 includes a main body 61 of a predetermined thickness and having formed therein toward the rear portion thereof a generally L-shaped heater control recess 62 (see FIG. 4), and a generally rectangular tensioning apparatus recess 63 in the front portion thereof, the heater control recess 62 having a pair of spaced-apart parallel rails 70 therein extending laterally thereof (one shown in FIG. 4). Formed along one side of the baseplate 60 is an anvil block 64 having a flat strap guide surface or apron 65 which has formed in the front end thereof an internally threaded opening having threadedly disposed therein a strap rest button 68, for a purpose to be described more fully hereinafter. A heat buffer 66 may be received in a complementary recess 67 adjacent to the inner edge of the anvil block 64.

The gripping and tensioning apparatus 100 includes an elongated rear strap spacer 101 secured to the baseplate 60 adjacent to the rear end thereof and projecting laterally therefrom at the rear end of the strap guide apron 65. The rear strap spacer 101 has a flat planar upper guide surface 102 and a flat planar lower guide surface 103 spaced apart a predetermined distance, both of the surfaces 102 and 103 being disposed substantially parallel to the strap guide apron 65 and spaced vertically therefrom. Formed along the front edge of the rear strap spacer 101 and extending substantially normal to the longitudinal axis of the strap guide apron 65 is a fixed shear blade 104. Secured to the baseplate 60 and spaced a predetermined distance forwardly of the rear strap spacer 101 and extended substantially parallel thereto is an elongated front strap spacer 105 having upper and lower strap guide surfaces 106 and 107 which are respectively substantially coplanar with the strap guide surfaces 102 and 103 on the rear strap spacer 101. Disposed adjacent to the front end of the strap guide apron 65 substantially parallel thereto is a separating plate, generally designated by the numeral 110, and fixedly secured adjacent to the inner end thereof by mounting bolts 111 to the baseplate 60.

Disposed immediately rearwardly of the separating plate 110 is a lifting link, generally designated by the numeral 115, which includes an attachment arm 116 and a lifting finger 68, respectively disposed in use in slots in the baseplate 60. Formed in the attachment arm 116 and the lifting finger 118 are coaxial bores aligned in use coaxially with a corresponding transverse bore in the baseplate 60, all for receiving therethrough a roll pin 117 for pivotally mounting the lifting link 115 on the baseplate 60. In use, the lifting finger 118 extends beneath the separating plate 110 for engagement with the bottom surface thereof. Also formed on the lifting link 115 is a cam arm 119 which curves upwardly and forwardly from the lifting finger 118 to overlie the separating plate 110 for a purpose to be described more fully below.

A cradle support member, generally designated by the numeral 120, includes an angle attachment bracket 121 secured by means of mounting screws 122 to a cradle support mounting block (not shown). Integral with the attachment bracket 121 and extending upwardly therefrom at the end thereof adjacent to the strap apron 65 is a cradle clevis 125 having an upwardly extending bight portion 123 and a pair of spaced-apart rearwardly extending legs 124. Integral with the bight portion 123 of the cradle clevis 125 and extending upwardly therefrom is a mounting post 126.

Mounted on the cradle support member 120 is a cradle, generally designated by the numeral 130, having a body portion 131 provided with a pair of forwardly extending mounting arms 132 respectively disposed in use along the outer side surfaces of the legs 124 of the cradle clevis 125. Extending through aligned openings in the cradle clevis legs 124 and the cradle mounting arms 132 is a pivot pin 133 for pivotally mounting the cradle 130 on the cradle support member 120. Coiled about the pivot pin 133 between the cradle clevis legs 124 is a torsion leaf spring 134 having one end thereof disposed in engagement with the mounting post 126 and having the other end thereof disposed in engagement with the cradle body 131 for resiliently urging the cradle 130 toward rotation in a counterclockwise direction about the pivot pin 133, as viewed in FIG. 3. Formed on the cradle body 131 at the rear end thereof is a flat planar surface (not shown) disposed for camming engagement with the cam arm 119 of the lifting link 115, for a purpose to be explained hereinafter. Formed integrally with the cradle body 131 at the rear end thereof toward the side thereof away from the strap apron 65 is a pawl cylinder 138.

Carried by the cradle 130 is a rotary dog assembly, generally designated by the numeral 140, and including an elongated rotary dog shaft 141 disposed in a complementary bore and extending completely therethrough. Fixedly secured to the shaft 141 adjacent to one end thereof is a rotary dog 148 disposed in a complementary shaped recess in the cradle body 131. The cylindrical outer surface of the rotary dog 148 is serrated or knurled and projects from the cradle body 131 at the bottom thereof for engagement with the supply portion 57 of the strap in a manner to be described more fully below. The adjacent end of the shaft 141 is rotatably supported in a bearing 149 to facilitate rotation of the shaft 141.

Disposed in and extending through a complementary bore in the cradle body 131 is a handle pivot pin 161 having the end thereof adjacent to the pawl cylinder 138 extending a predetermined distance outwardly beyond the adjacent end of the cradle body 131. This projecting end of the pivot pin 161 extends through complementary openings adjacent to the lower ends of inner and outer elongated handle plates 162 and 163, the upper ends thereof having sandwiched therebetween the lower end of a tensioning handle 160. Coaxially mounted on the pivot pin 161 between the handle plates 162 and 163 is a drive gear 165 disposed for meshing engagement with the outer teeth on another drive gear (not shown). The handle 160 and the handle plates 162 and 163 are all secured together by bolts 167 and 167a, the bolt 167 having a head 169 and the bolt 167a having an enlarged spacer head 168.

The lower end of the tensioning handle 160 has a recess 166 formed in the inner side surface thereof, in which is received a pawl member, generally designated by the numeral 170, having an opening therein through which is received the bolt 167 for pivotally mounting the pawl member 170. The pawl member 170 is provided with a pawl tooth disposed for ratcheting engagement with the teeth of the drive gear 165 to prevent rotation thereof in a clockwise direction, as viewed in FIG. 3. Projecting outwardly from the opposite end of the pawl member 170 is a spring seat finger 173, for a purpose to be described more fully below. The lower end of the pawl member 170 projects downwardly and forwardly beneath the handle plates 162 and 163 and has formed thereon an arcuate seat 175 and a camming surface (not shown).

A positioning lever, generally designated by the numeral 180, has a flat side plate 181 which is disposed in use to the inner handle plate 162 and is secured to the outer surface thereof by the bolt 167a for pivotal movement with respect thereto. Integral with side plate 181 and extending upwardly therefrom substantially normal thereto a predetermined distance above the tensioning handle 160 is a handle portion 182 for manipulating the positioning lever 180. Projecting downwardly and rearwardly from the side plate 181 is a stop finger 183 disposed for engagement with the head 169 of the bolt 167, for limiting pivotal movement of the positioning lever 180 in the counterclockwise direction, as viewed in FIGS. 1 and 3. Both the pawl member 170 and the positioning lever 180 are simultaneously resiliently urged toward rotation in a counterclockwise direction, as viewed in FIG. 3, by spring counter means (not shown).

Respectively secured to the opposite ends of the cradle body 131 by means of screws 198 are two end plates 197 which securely hold in place the pivot pins 133 and 161 and the shaft 141. Projecting downwardly from the rear end of one of the side plates 197 is a strap guide finger 199 which projects a slight distance downwardly below the surface of the strap apron 65 adjacent to the outer edge thereof for guiding the strap and confining it to a path overlying the strap apron 65.

Referring now also to FIGS. 4 and 10 through 11A of the drawings, the sealing and shearing apparatus 200 will be described. The apparatus 200 is mounted on an irregularly shaped frame or housing 201 which is fixedly secured to the baseplate 60 and overlies the heater control recess 62 therein. The frame 201 is provided with a relatively thick upwardly extending end wall 205 overlying the strap apron 65 and spaced a predetermined distance thereabove and a relatively thin upstanding end wall 207 adjacent to the opposite side of the baseplate 65 and an upstanding bearing wall 203 disposed between the end walls 205 and 207 substantially parallel thereto. The bottom of the bearing wall 203 is disposed well above the baseplate 60 and has formed thereon, at the side thereof facing the end wall 207, a downwardly extending lip or projection 202. Disposed between the end wall 205 and the bearing wall 203 are two longitudinally spaced-apart cylindrical bearing turrets 204 extending coaxially with each other and substantially parallel to the walls 203 and 205.

Formed in the outer surface of the end wall 205, between the front and rear strap spacers 105 and 101, is a deep slot or channel 206 substantially rectangular in transverse cross section, the inner wall of the channel 206 in turn having formed therein adjacent to the rear end thereof a narrow elongated slot 209. The rear upper surface of the end wall 205 has an inclined surface 208 which slopes downwardly and forwardly to the channel 206, for a purpose to be described below.

Disposed in the channel 206 is a complementary shaped pressure block, generally designated by the numeral 210, having at the upper rear end thereof an inclined cam surface 211 which slopes downwardly and rearwardly to the rear surface of the pressure block 210 adjacent to the lower edge of the inclined surface 208. Extending vertically through the pressure block 210 inwardly of the cam surface 211 is a cylindrical bore 212 having disposed in the lower end thereof a regulating screw 213. Disposed in the bore 212 above the screw 213 in engagement therewith is a coil compression spring 214, upon the upper end of which is seated a plunger member 216 which normally projects a predetermined distance upwardly above the top surface of the pressure block 210. Preferably, the plunger 216 is provided with an enlarged base portion 216a adapted for engagement with a complementary shoulder (not shown) in the bore 212 for limiting the upward movement of the plunger 216 under the urging of the compression spring 214. Preferably, the modulus of elasticity of the compression spring 214 is relatively high, the amount of force necessary to depress the plunger 216 against the urging of the bias spring 214 being variable by adjustment of the regulating screw 213.

A shear blade 215 is disposed in a complementary recess 217 and the rear surfaces of the pressure block 210 and is fixedly secured thereto by means of a mounting screw 218, the inner end of the shear blade 215 projecting inwardly beyond the inner surface of the pressure block 210 and being accommodated in the slot 209. The shear blade 215 is disposed in use a very slight distance forwardly of the shear blade 104 on the rear strap spacer 101 for cooperation therewith to sever the supply portion of the strap in a manner to be described more fully below.

A generally rectangular end plate 220 is secured to the outer surface of the end wall 205, the inner surface of the end plate 220 having formed therein a vertically extending part-cylindrical recess 222 receiving therein the outer portion of a vertically extending coil compression spring 223, the inner portion of which is received in a complementary part-cylindrical opening or recess 219 in the outer surface of the pressure block 210, the compression spring 223 serving to inhibit vertical movement of the pressure block 210. Also formed in the inner surface of the end plate 220 and extending upwardly from the bottom end thereof is an elongated slot 224 for accommodating therein the outer end of the shear blade 215 which projects outwardly beyond the outer surface of the pressure block 210. The end plate 220 extends a substantial distance upwardly above the upper surfaces of the end wall 205 and the pressure block 210 and has mounted thereon a roll pin 225 which extends inwardly of the end plate 220 a predetermined distance above the top of the end wall 205 for a purpose to be described below.

Also carried in the end plate 220 above the top of the end wall 205 and rearwardly of the roll pin 225 is a bearing 226 having journalled therein the reduced diameter end 231 of an elongated cam shaft 230 which extends inwardly of the end plate 220 substantially normal thereto, the opposite end of the cam shaft 230 also being provided with a reduced diameter portion 232 journalled in a bearing 233 in the bearing wall 203. A lever handle 235 is threadedly engaged with the cam shaft 230 and extends radially outwardly therefrom a slight distance inwardly of the end plate 220 for manually rotating the cam shaft 230 about the longitudinal axis thereof, the handle 235 being engageable with the roll pin 225 for limiting the rotation of the cam shaft 230 in a clockwise direction, as viewed in FIG. 1. Projecting from the cam shaft 230 are a number of cam lobes including (progressing from the inner end to the outer end of the cam shaft 230) a heater drive lobe 240 having a drive cam surface 241 and a first dwell surface 242 and a retract cam surface 243 and a second dwell surface 243a thereon, a heater latching lobe 245 having a cam surface 244 thereon, a pressure block plunger lobe 246 having a cam surface 247 thereon and a pressure block sealing lobe 248 having a cam surface 249 thereon.

A rocker arm, generally designated by the numeral 250, is disposed between the bearing turrets 204, the rocker arm 250 being fixedly secured to an elongated pivot pin 251 extending therethrough, the opposite ends of which pin are respectively received in complementary openings extending coaxially through the turrets 204 for pivotally mounting the rocker arm 250 thereon. The rocker arm 250 includes a downwardly extending coupling arm 252 having an opening therein through which is received a coupling bolt 253 secured in place by a nut 254. The rocker arm 250 is also provided with a drive cam member 255 projecting inwardly therefrom and having a camming surface 256 thereon disposed for engagement with the surfaces 241, 242, 243 and 243a of the cam lobe 240 on the cam shaft 230. The rocker arm 250 is also provided with a latch cam member 257 projecting upwardly and outwardly thereof and having thereon a camming surface (not shown) on the front side thereof disposed for engagement with the camming surface 244 of the cam lobe 245 on the cam shaft 230.

Disposed in the heater control recess 62 beneath the bearing wall 203 and the bearing turrets 204 is a heater carriage, generally designated by the numeral 260, provided with a pair of vertically spaced-apart flat retaining flanges 262 projecting therefrom toward the strap apron 65, the lower one of the retaining flanges 262 extending forwardly and rearwardly of the heater control recess 62 a sufficient distance so that the opposite ends thereof respectively rest upon the rails 70 for sliding engagement therewith. Formed in the heater carriage 260 is a generally rectangular connector recess 261 communicating with the space between the retaining flanges 262, the carriage 260 also having a pair of bearing arms 263 extending upwardly and outwardly therefrom in a direction opposite to the direction of the retaining flanges 262 and adapted for sliding engagement with the underside of the bearing wall 203, the distal ends of the bearing arms 263 being engageable with the lip 202 on the bearing wall 203 for limiting the sliding movement of the heater carriage 260 along the rails 70. The bearing arms 263 are spaced apart laterally of the heater carriage 260 (forwardly and rearwardly of the baseplate 60) and are interconnected at the inner ends thereof by a relatively small diameter roll pin 264 and a relatively large diameter latch pin 266.

Also disposed between the bearing arms 263 is a latch clip, generally designated by the numeral 265, and preferably formed of spring steel, the clip 265 being generally U-shaped and having a bight portion wrapped around the coupling bolt 253 on the rocker arm 250 and a pair of legs extending outwardly toward the distal end of the bearing arms 263. The upper one of the legs of the latch clip 265 is bent adjacent to the distal end thereof downwardly toward the lower leg of the clip 265 to form a hook portion 268, the lower end of the hook portion 268 being normally spaced from the lower leg of the latch clip 265 a distance less than the diameter of the roll pin 264 and terminating in an upwardly inclined cam flange 269. Normally, the hook portion 268 of the latch clip 265 is hooked over the latch pin 266, as illustrated in FIG. 4, for coupling the heater carriage 260 to the rocker arm 250.

Disposed between the retaining flanges 262 of the heater carriage 260 substantially parallel thereto is an elongated electrically resistive heating element 270 projecting laterally well beyond the ends of the retaining flanges 262 toward the strap apron 65. The inner end of the heating element 270 is preferably provided with a pair of plugs or prongs (not shown) adapted to be received in complementary sockets in a crystal connector 275 which is received in the recess 261 in the heater carriage 260, the heating element 270 and the crystal connector 275 being respectively fixedly secured to the heater carriage 260 by means of mounting screws 272 and 273. The crystal connector 275 is in turn provided with a pair of terminals 274 to which may be connected the conductors of an A.C. electrical power input line. Fixedly secured to the inner surface of the bearing wall 203 by means of a mounting screw 277 is one end of a coil torsion spring 276, the other end of which forms a return spring leaf 278 disposed for engagement with the rear end of the latch pin 266 which projects rearwardly from the heater carriage bearing arms 263 for resiliently urging the heater carriage 260 toward a retracted position, illustrated in FIG. 4, wherein the distal ends of the bearing arms 263 are disposed in engagement with the lip 202 on the bearing wall 203.

Disposed between the end wall 207 and the bearing wall 203 of the frame 201 is a fan or blower assembly, generally designated by the numeral 280, which includes an electric motor 281, which is preferably a single phase induction motor of the shaded pole type spaced from the end wall 207 by a pair of cylindrical spacers 282 through which are received mounting screws for fixedly mounting the motor 281 on the end wall 207. The motor 281 has an output shaft 285 projecting inwardly therefrom substantially perpendicular to the bearing wall 203. The opposite ends of the shaft 285 are respectively journalled in bearings 286 fixedly secured to the opposite sides of the motor pole plates by a bracket 289. Fixedly secured to the shaft 285 inwardly of the inner bearing 286 is a fan blade assembly 287 for directing a stream of cooling air inwardly of the sealing and shearing apparatus 200 when the fan motor is energized for cooling the apparatus and removing therefrom vapors caused by the heating of the strap 55.

The entire portion of the heating and sealing apparatus 200 from the inner surface of the end wall 205 to the end wall 207 is enclosed by a cover 290 which is preferably formed of plastic, but which may be formed of any suitable material, the cover 290 being provided with a series of louvers 295 in the upper surface thereof overlying the fan assembly 280 permitting cooling air to be drawn into the heating and sealing apparatus 200 by the fan blade 287. Mounted in the top of the cover 290 is an electrical light fixture 297 adapted to be connected to and energized by the source of A.C. electric current for indicating when the heater is turned on. In the preferred embodiment of the invention, the fan assembly 280, the heater element 270 and the light fixture 297 are all connected in parallel across the conductors of an A.C. power input line 293 secured to the cover 290 by plug 294 (see FIG. 2), each of these electrical fixtures preferably being adapted to be operated from a standard 60 Hz. 120-volt electrical power source.

The combination tool 50 is preferably also provided with a utility handle 291 for transporting the tool, the handle 291 being provided at one end thereof with a generally rectangular coupling block 292 receivable in a complementary opening at the rear end of the frame 201 for lifting the apparatus 50, the handle 291 being readily removable from the apparatus when the apparatus is in use so as not to interfere with the operation of the tensioning handle 160 and the cam shaft lever handle 235.

Referring now to FIGS. 5 through 9 of the drawings, the strap guide surface 65 of the anvil block 64 has preformed therein at the rear end thereof a plurality of elongated parallel grooves or channels 300 which extend longitudinally of the anvil block 64 from the rear end thereof to rounded forward ends 303, the channels 300 being respectively separated from one another by a plurality of narrow elongated parallel ribs 301. The ribs 301 are respectively provided with flat upper surfaces 302 which are substantially coplanar with the guide surface 65. The channels 300 are identically dimensioned, as are the ribs 301, the channels 300 having a width several times as great as the width of the ribs 301.

The pressure block 210 is provided with a flat bottom surface 304 directly overlying the strap guide surface 65 of the anvil block 64 substantially parallel thereto. Projecting downwardly from the bottom surface 304 are a plurality of longitudinally extending and laterally spaced-apart parallel ribs 305 which are, respectively, substantially identical in transverse cross section to the ribs 301 on the anvil block 64. The ribs 305 serve to define a plurality of parallel channels 306 therebetween along the bottom surface 304 of the pressure block 210, the bottom surfaces 307 of the ribs 305 being substantially coplanar. The ribs 305 are equidistantly spaced apart and are so arranged as to be respectively disposed centrally of the channels 300 in the anvil block 64, the ribs 301 on the anvil block 64 being in turn respectively disposed centrally of the channels 306.

Figure 9:
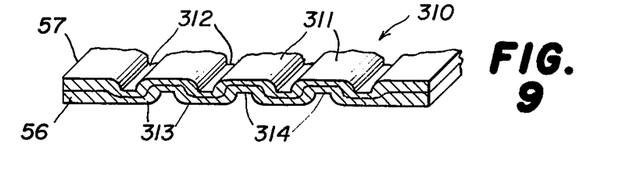
FIG. 9 is an enlarged, fragmentary, front perspective view of a portion of the corrugated seal joint formed in the overlapping strap portions by the pressure members when they are moved to the position illustrated in FIG. 8.
Figure 10:
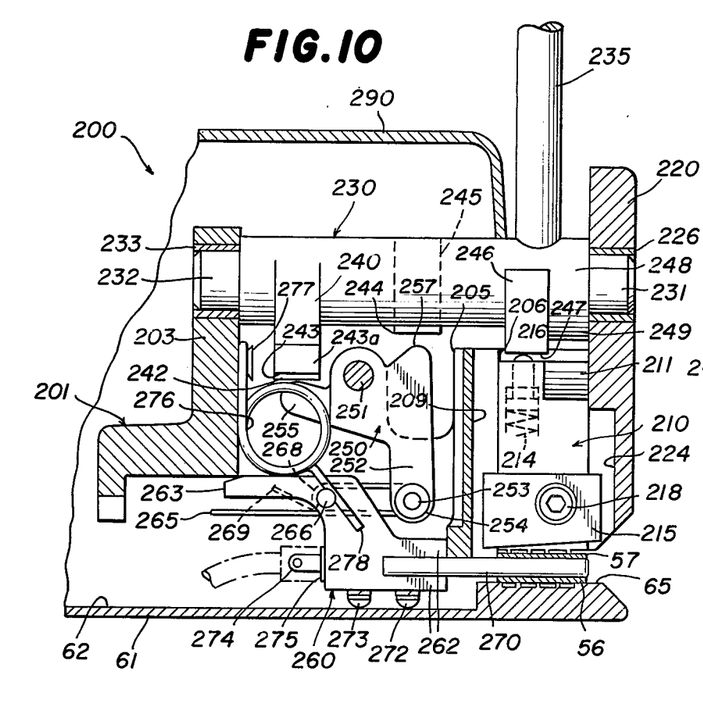
FIG. 10 is a fragmentary view in vertical section similar to FIG. 4, illustrating the sealing apparatus in the strap-heating configuration thereof.
Figure 10A:
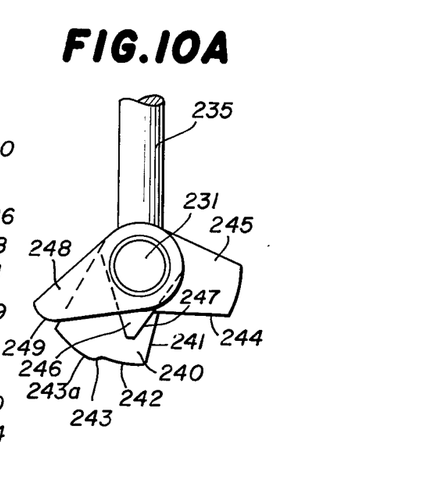
FIG. 10A is a fragmentary side elevational view of the cam shaft of the sealing mechanism in the configuration illustrated in FIG. 10.

In operation, it will be appreciated that when the overlapping strap portions 56 and 57 are pressed together between the anvil block 64 and the pressure block 210, the ribs 301 and 305 cooperate to deform the overlapping and bonded-together strap portions 56 and 57 into the channels 306 and 300, thereby to form in the supply portion 57 of the strap a plurality of grooves or valleys 312 separated by and alternating with ridges 311, and to form in the leading end 56 of the strap a plurality of grooves or valleys 314, separated by and alternating with ridges 313, thereby to form a substantially corrugated joint 310, as best seen in FIG. 9.

The operation of the combination tool 50 will now be described in detail. Initially, the cord 293 of the apparatus 50 is plugged into a 110–120 VAC outlet and allowed to heat up for a sufficient time for the heating element 270 to reach the desired operating temperature which, in the preferred embodiment of this invention, is at least 725° F. Plugging in of the cord 293 also energizes the fan motor 281 and the light 297. The tool 50 is then placed by use of the utility handle 291 atop the object 51 to be strapped, as shown in FIG. 1, with the operator preferably being positioned behind the tool 50 (to the left as viewed in FIG. 1), and the handles 235 and 160 are placed in their forwardmost positions, i.e., with the handle 235 resting upon the roll pin 225, and with the tensioning handle 160 latched in a downward position by means not shown.

During this downward latching movement of the tensioning handle 160, it acts as a first order lever with the fulcrum being the pivot pin 133 for exerting an upward force against the pivot pin 161 to lift the entire cradle 130 and pivot it about the axis of the pivot pin 133 against the urging of the tension spring 134. As the cradle 130 is pivoted upwardly, a camming surface thereon engages the cam arm 119 on the lifting link 115 to effect a pivotal movement thereof about the axis of the roll pin 117 in a counterclockwise direction, as viewed in FIG. 3, thereby bringing the lifting finger 118 into engagement with the underside of the separating plate 110 to lift the outer end of the plate 110 up a predetermined distance above the strap apron 65. In this position, the pawl member 170 will have been pivoted out of engagement with the drive gear 165.

When the tensioning handle 160 has been latched in its downward position, the leading end 56 of a length of plastic strap is inserted forwardly along the strap apron 65 and beneath the rear guide member 101 and the front guide member 105 and the raised separating plate 110 and inwardly of the raised guide projection 199 on the side plate 197 until the leading end 56 projects a slight distance forwardly of the separating plate 110. With the leading end 56 of the strap thus positioned in the combination tool 50, the handle portion 182 of the positioning lever 180 is depressed toward the tensioning handle 160, thereby pivoting the positioning lever 180 about the axis of the bolt 167a against the urging of a compression spring (not shown) for releasing the tensioning handle 160 from its latched position.

The cradle 130 is now pivoted back downwardly in a counterclockwise direction, as viewed in FIG. 3, about the axis of the pivot pin 133 under the urging of the torsion spring 134 until the enlarged head 168 of the bolt 167a engages a spring-biased rearwardly projecting detent 193 (see FIG. 3). The modulus of elasticity of the detent bias spring (not shown) is such that the projecting detent 193 limits further upward movement of the tensioning handle 160 under the urging of the torsion spring 134, the application of further manual force to the tensioning handle 160 being necessary to depress the detent 193 and move the tensioning handle 160 back up past its detent position. The movement of the tensioning handle 160 from its latched position back up to the detent position permits the lifting link 115 to be pivoted back in a clockwise direction, as viewed in FIG. 3, to its original position under the urging of the deflected separating plate 110, thereby permitting the separating plate 110 to return to its original position wherein it cooperates with the strap rest button 68 for securely clamping therebetween the leading end 56 of the strap. The strap rest button 68 is threadedly engaged in the baseplate 60 and by appropriate adjustment of this screw-type button 68 the force with which the leading end 56 of the strap is clamped in place may be adjusted.

It will be noted that when the apparatus is in the detent position the cradle 130 has not been fully lowered to its original position and the rotary dog 148 remains spaced a slight distance above the separating plate 110 to accommodate the passage of the supply portion 57 of the strap therebetween. Also, it will be noted that in this position, the strap guide finger 199 on the side plate 197 will also be disposed a predetermined distance above the strap apron 65 to accommodate insertion of the supply portion 57 of the strap from the side of the tool 50. Thus, at this point, the supply portion 57 of the strap is slid into place between the separating plate 110 and the rotary dog 148 and above the rear guide member 101 and the front guide member 105. In this position, it will be noted that the portions of the leading end 56 and supply portion 57 of the strap extending between the front and rear guide members 101 and 105 are vertically spaced apart thereby and are disposed in overlapping relationship therebetween, all for a purpose to be described more fully below.

At this point, the tensioning handle 160 is manually pulled back up past the detent position thereof, thereby depressing the detent member 193 and pivoting the cradle 130 back down to its original position, as illustrated in FIG. 3, wherein the serrated peripheral surface of the rotary dog 148 cooperates with an insert 113 (FIG. 3) in the separating plate 110 firmly to grip therebetween the supply portion 57 of the strap. It will be appreciated that the force with which the supply portion 57 of the strap engages the rotary dog 148 is also variable by appropriate adjustment of the strap rest button 68. When the tensioning handle 160 has been moved back to the positions illustrated in FIG. 3, it will be noted that the strap guide finger 199 on the side plate 197 has been moved back down into its original position extending below the surface of the strap apron 65 for preventing the strap from being displaced laterally from the combination tool 50. In addition, it will be noted that as the tensioning handle 160 moves up past the detent position thereof, the pawl member 170 is moved back into engagement with the teeth of the drive gear 165.

At this point, the strap which is looped about the object 51 may be tensioned by a back and forth movement of the tensioning handle 160 between the position illustrated in FIG. 3 and a rearward position in engagement with the cover 290, the operator preferably operating the tensioning handle 160 with his left hand while he grips the handle 235 with his right hand. As the handle 160 is moved rearwardly, in a counterclockwise direction as viewed in FIG. 3, the drive gear 165 is rotated in a clockwise direction by engagement therewith of the pawl 170, thereby resulting in rotation of drive mechanism (not shown) to effect a corresponding rotation of the rotary dog shaft 141 and the rotary dog 148 for moving the supply portion 57 of the strap rearwardly of the combination tool 50, thereby taking up slack in the strap and effecting tensioning thereof. When the tensioning handle 160 has reached the limit of its rearward travel, it is moved back forwardly to the position illustrated in FIG. 3 for another stroke, with the pawl 170 ratcheting over the teeth of the drive gear 165 during this forward movement of the handle 160. This tensioning operation continues until the desired tension in the strap has been achieved.

When the strap has been sufficiently tensioned, the operator grips the tensioning handle 160 with his left hand and grips the cam shaft lever handle 235 with his right hand and moves the handle 235 rearwardly in a counterclockwise direction, as viewed in FIG. 3, for sealing the overlapping portions 56 and 57 of the strap and severing the supply portion thereof. Preferably, the sealing and shearing operation is effected by a single continuous movement of the handle 235 from the position illustrated in FIGS. 1 through 4 to the position illustrated in FIG. 11, which movement preferably takes approximately two seconds, thereby effecting a counterclockwise rotation of the cam shaft 230, as viewed in FIG. 3, for sequentially effecting a series of operations.

When the lever handle 235 is in its initial or home position illustrated in FIGS. 1 through 4, it rests upon the roll pin 225, with none of the cam lobes on the cam shaft 230 being in engagement. The latch clip 265 is clipped over the latch pin 266 for coupling the heater carriage 260 to the rocker arm 250, and the heater carriage 260 is held in its retracted position with the distal ends of the bearing arms 263 in engagement with the lip 202 on the bearing wall 203 by the action of the return spring 276, thereby holding the heater element 270 retracted from between the overlapping portions of the strap 56 and 57 and holding the rocker arm 250 back in the position illustrated in FIG. 4. The pressure block 210 is held with the upper surfaces thereof substantially flush with the upper surface of the end wall 205 by the action of the compression spring 223, with the movable shear blade 215 being disposed above and out of engagement with the supply portion 57 of the strap. The plunger 216 projects upwardly above the top surface of the pressure block 210 under the urging of the compression spring 214.

During about the first thirty degrees of the rearward movement of the handle 235, the cam surface 241 on the cam lobe 240 engages the cam surface 256 on the rocker arm drive cam 255 to effect a cammed pivotal movement of the rocker arm 250 in a counterclockwise direction about the axis of the pivot pin 251, as viewed in FIG. 4, thereby sliding the heater carriage 260 along the rails 70 to the right, as viewed in FIG. 4, under the coupling action of the latch clips 265, for moving the distal end of the heating element 270 between the spaced-apart overlapping portions 56 and 57 of the strap in the region between the front and rear strap spacers 105 and 101. As the heating element 270 is being moved between the portions 56 and 57 of the strap, the cam surface 247 on the cam lobe 246 engages the projecting plunger 216, the modulus of elasticity of the compression spring 214 being greater than that of the compression spring 223 so that the camming engagement between the cam surface 247 and the plunger 216 effects a downward movement of the pressure block 210 against the urging of the compression spring 223, while the plunger 216 remains substantially undepressed with respect to the pressure block 210. The pivotal movement of the rocker arm 250 of the heating element 270 continues until the arcuate dwell surface 242 on the cam lobe 240 engages the rocker arm drive cam 255, at which point the heating element 270 is fully extended between the strap portions 56 and 57 in the position illustrated in FIG. 10, with the distal end of the upper retaining flange 262 bearing against the inner surface of the end wall 205 for limiting the outward movement of the heater carriage 260 and the heating element 270.

As the backward motion of the handle 235 continues, and while the dwell surface 242 of the cam lobe 240 rides over the rocker arm drive cam 255, the pressure block 210 bottoms out against the supply portion 57 of the strap and cooperates with the strap apron 65 for firmly pressing therebetween the overlapping portions 56 and 57 of the strap with the heater element 270 therebetween. The force with which the heater element 270 and the strap portions 56 and 57 are pressed together is limited by the compression spring 214, force applied by the cam lobe 246 beyond a predetermined force serving to depress the plunger 216 and thus be absorbed by the compression spring 214, so that the overlapping strap portions 56 and 57 are not significantly deformed by the ribs 301 and 305. The predetermined force at which the plunger 216 is depressed can be varied by appropriate adjustment of the regulating screw 213, as was described above. When the overlapping portions 56 and 57 of the strap are thus firmly pressed into contact with the heating elements 270, the surfaces thereof in contact with the heating element 270 are melted. It will be noted that when the pressure block 210 is thus held in its strap-heating position, the shear blade 215 remains up out of contact with the supply portion 57 of the strap.

As the rearward movement of the handle 235 continues, the cam surface 247 on the cam lobe 246 moves past the plunger 216 permitting it to return to its projecting position and then permitting the pressure block 210 to return upwardly to its original position out of contact with the strap supply portion 57 under the urging of the compression spring 223. Simultaneously, the camming surface 243 on the cam lobe 240 is brought into engagement with the rocker arm drive cam 255 for effecting a further counterclockwise pivotal movement of the rocker arm 250, as viewed in FIG. 10. However, since further outward movement of the heater carriage 260 is prevented by engagement of the retaining flange 262 with the end wall 205, this further pivotal movement of the rocker arm 250 results in the hook portion 268 of the latch clip 265 being cammed up over the latch pin 266 to permit the latch pin 266 to pass therebeneath. As soon as the hook portion 268 has cleared the latch pin 266, the heater carriage 260 is snapped back into its retracted position illustrated in FIG. 4, under the urging of the return spring 276. A further slight rearward movement of the handle 235 brings the second dwell surface 43a on the cam lobe 240 into engagement with the rocker arm 255 for holding the rocker arm 250 in the position illustrated in broken line in FIG. 11.

Figure 8:
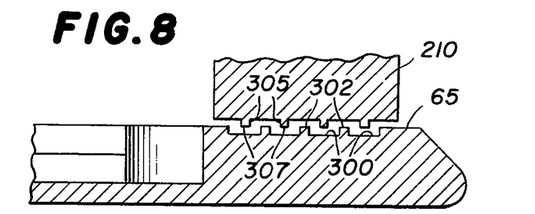
FIG. 8 is a view, similar to FIG. 7, but with the overlapping strap portions not shown, illustrating the position of the pressure members during the sealing and embossing operation.
Figure 11:
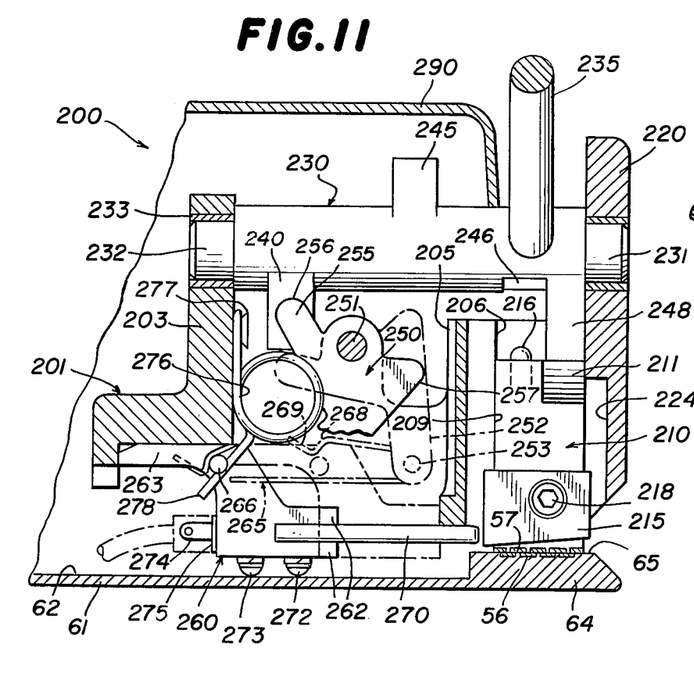
FIG. 11 is a view similar to FIG. 10, showing the sealing apparatus disposed in the sealing configuration thereof.
Figure 11A:
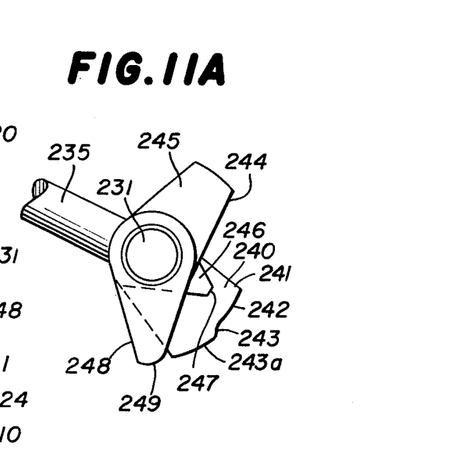
FIG. 11A is a side elevational view similar to FIG. 10A of the cam shaft in the configuration illustrated in FIG. 11.

As the rearward movement of the handle 235 continues, the cam surface 249 of the cam lobe 248 is brought into camming engagement with the cam surface 211 on the pressure block 210, again forcing the pressure block 210 downwardly against the urging of the compression spring 223 to a sealing condition illustrated in FIGS. 8 and 11, wherein the top surfaces 302 of the ribs 301 are substantially coplanar with the bottom surfaces 307 of the ribs 305. As this downward movement of the pressure block 210 continues, the melted surfaces of the overlapping portions 56 and 57 of the strap are brought into engagement with each other and are firmly pressed together between the ribs 305 of the pressure block 210 and the ribs 301 of the strap apron 65 of the anvil block 64 to effect a firm corrugated heat-sealed joint between the overlapping strap portions 56 and 57 which are accommodated by the channels 300 and 306.

As the pressure block 210 is moved to the position illustrated in FIGS. 8 and 11, the overlapping strap portions 56 and 57 are deformed by the ribs 301 and 305 into the channels 306 and 300, thereby to produce in the overlapping strap portions the ridges 311 and 313 and the valleys 312 and 314 illustrated in FIG. 9, the formation of which ridges and valleys produces a kneading-like motion of the molten strapping surfaces, and serves substantially to increase the total contact area between the molten overlapping surfaces of the strap portions 56 and 57, thereby to effect a much stronger interface bond therebetween. Furthermore, the deformation of the overlapping strap portions 56 and 57 to form the corrugated joint 310 effects a substantially evenly distributed application of pressure throughout the joint area, thereby further to enhance the strength of the bond.

The pressure with which the strap portions 56 and 57 are pressed together is controlled by the amount of force applied to the handle 235 by the operator. As the pressure block 210 bottoms out, in the position illustrated in FIG. 11, the shear blade 215 passes downwardly past the shear blade 104 and cooperates therewith to sever the supply portion 57 of the strap at the rear guide member 201.

At this point, the heat-sealed joint in the strap has been completed and the operator moves the tensioning handle 160 with his left hand all the way forward to the latched position, for again elevating the cradle 130 and the separating plate 110 and the strap guide finger 199 to permit removal of the strap from the strap-gripping apparatus 100. Then, with his right hand, the operator moves the sealing lever handle 235 back to the forward position thereof illustrated in FIG. 4, thereby permitting the pressure block 210 to return upwardly to its original position under the urging of the compression spring 223. This forward movement of the handle 235 also brings the camming surface 244 of the cam lobe 245 into engagement with the latch cam 257 on the rocker arm 250 for pivoting the rocker arm 250 in a clockwise direction from the broken line position to the solid line position illustrated in FIG. 11. As the rocker arm 250 pivots back to its original position, the cam flange 269 on the latch clip 265 engages the roll pin 264 on the heater carriage 260 and rides up thereover, slightly separating the legs of the latch clip 265 and bringing the cam flange 269 into position for camming engagement with the latch pin 266. The cam flange 269 then rides up over the latch pin 266 and therebehind for relatching the latch clip 265 in place for coupling the rocker arm 250 to the heater carriage 260. With the handles 235 and 160 now returned to their forwardmost positions, the combined tool 50 can be moved sideways to strip it from the strap and the object 51 by use of the utility handle 291.

From the foregoing, it can be seen that there has been provided an improved combination strapping tool for both gripping and tensioning a length of plastic strap about an object and then forming a heat-sealed bonded joint between the ends of the length of strap and severing the length of strap from the supply thereof.

More particularly, there has been provided a combination strapping tool of the character described, wherein there is formed a corrugated joint between the overlapping strap portions having alternating ridges and valleys extending longitudinally of the strap.

There has also been provided a combination strapping tool of the character described, wherein the corrugated joint is formed by complementary ridges and grooves respectively formed on a moving pressure block and a stationery anvil block, between which the overlapping strap portions are pressed after having the facing surfaces thereof heated to a molten condition.

While there has been described what is considered to be the preferred embodiment of the invention, it will be understood that various modifications may be made therein, and it is intended to cover in the appended claims all such modifications that fall within the true spirit and scope of the invention.

What is claimed is:

1. Strapping apparatus for securing a length of plastic strap around an object, said apparatus comprising a frame, strap-gripping means mounted on said frame for holding the strap encircled in a loop in a tensioned condition about the object with the leading end of the strap overlapping the supply portion thereof, heating means carried by said frame adjacent to the overlapping strap portions for effecting melting of the facing portions thereof, a first pressure member carried by said frame and having a plurality of elongated and equal-width first grooves therein equidistantly spaced apart by first ribs, and a second pressure member carried by said frame and having a plurality of elongated and equal-width second ribs projecting therefrom equidistantly spaced apart by second grooves, each of said first and second grooves being rectangular in transverse cross section and having an elongated flat rectangular recessed surface, each of said first and second ribs being rectangular in transverse cross section and having an elongated flat rectangular end surface with the width of each said end surface being no greater than about one-third the width of each groove recessed surface, said end surfaces of said first and second ribs being respectively disposed centrally of and in parallel facing relationship with said second and first groove recessed surface in longitudinal alignment therewith, said pressure members being movable with respect to each other to a sealing configuration wherein said first and second ribs are disposed in equidistantly spaced-apart interdigitated relationship with said ribs and said grooves cooperating to press together therebetween the melted overlapping strap portions and to deform the overlapping strap portions in a predetermined pattern as they are pressed together, whereby the pressure of said pressure means is substantially evenly distributed throughout the interface between the melted overlapping strap portions for formation of a strong joint therebetween.

2. The strapping apparatus set forth in claim 1, wherein only said second pressure member is movable with respect to said frame.

3. The strapping apparatus set forth in claim 1, wherein said grooves and said ribs are substantially straight and parallel to one another.

4. The strapping apparatus set forth in claim 1, wherein said ribs and said grooves extend longitudinally of the overlapping strap portions and are spaced apart laterally thereof when said pressure members are disposed in the sealing configuration thereof.

5. In a strapping apparatus for securing a length of plastic strap around an object and including a frame, strap-gripping means mounted on the frame for holding the strap encircled in a loop in a tensioned condition about the object with the leading end of the strap overlapping the supply portion thereof, heating means carried by the frame adjacent to the overlapping strap portions for effecting melting of the facing portions thereof and first and second pressure members respectively having first and second flat rectangular parallel pressure surfaces movable with respect to each other to a sealing configuration for pressing together therebetween the melted overlapping strap portions, the improvements comprising: a plurality of elongated and equal-length first ribs rectangular in transverse cross section integral with and extending from said first pressure surface substantially normal thereto, said first ribs being parallel and equidistantly spaced apart a distance at least three times the width thereof to define therebetween relatively wide first grooves rectangular in transverse cross section, said second pressure surface having a plurality of elongated parallel second grooves therein of the same width and transverse cross section as said first grooves and having a depth substantially equal to the height of said first ribs, said second grooves being equidistantly spaced apart to define a plurality of second ribs having substantially the same width and transverse cross section as said first ribs, each of said first and second ribs having an elongated flat rectangular end surface, said end surfaces of said first and second ribs being respectively disposed centrally of said second and first grooves in longitudinal alignment therewith, said first and second ribs being disposed in equidistantly spaced-apart interdigitated relationship in the sealing configuration of said pressure members, said ribs and said grooves cooperating in the sealing configuration of said pressure members to deform the overlapping strap portions in a predetermined pattern as they are pressed together, whereby the pressure of the pressure members is substantially evenly distributed throughout the interface between the melted overlapping strap portions for formation of a strong joint therebetween.

6. The apparatus of claim 5, wherein the height of each of said ribs is substantially less than the width of each of said grooves.

7. The apparatus of claim 5, wherein said first pressure surface is disposed above said second pressure surface and a length and width less than the length and width of said second pressure surface.

8. The apparatus of claim 5, wherein each of said second grooves has an arcuate end wall at one end thereof.

* * * * *

UNITED STATES PATENT AND TRADEMARK OFFICE
CERTIFICATE OF CORRECTION

PATENT NO. : 4,240,865

DATED : December 23, 1980

INVENTOR(S) : Robert B. Kyts

It is certified that error appears in the above-identified patent and that said Letters Patent are hereby corrected as shown below:

Column 14, line 11, "43a" should be --243a--.

Column 15, line 64, "surface" should be --surfaces--.

Column 16, line 63, after "and" first occurrence insert --has--.

Signed and Sealed this

Fourteenth Day of April 1981

[SEAL]

Attest:

RENE D. TEGTMEYER

Attesting Officer    Acting Commissioner of Patents and Trademarks